United States Patent [19]

Edwards

[11] 4,101,680

[45] Jul. 18, 1978

[54] CO-CRYSTALLIZATION OF DEXTROSE AND SUCROSE ON CEREAL PRODUCTS

[75] Inventor: Larry W. Edwards, Hillsdale, N.J.

[73] Assignee: CPC International Inc., Englewood Cliffs, N.J.

[21] Appl. No.: 756,931

[22] Filed: Jan. 5, 1977

[51] Int. Cl.$^2$ ............................................. A23L 1/164
[52] U.S. Cl. ..................................... 426/96; 426/103; 426/291; 426/302; 426/305
[58] Field of Search ................. 426/96, 103, 291, 293, 426/303, 305, 302

[56] References Cited

U.S. PATENT DOCUMENTS

| | | | |
|---|---|---|---|
| 2,824,009 | 2/1958 | Lindlow | 426/291 |
| 2,868,647 | 1/1959 | Vollink | 426/302 |
| 3,557,718 | 1/1971 | Chivers | 426/291 |
| 3,615,676 | 10/1971 | McKown | 426/293 |

*Primary Examiner*—Jeanette M. Hunter

[57] ABSTRACT

Dextrose and sucrose are co-crystallized onto the surface of breakfast cereal products; such as corn flakes, puffed wheat or puffed rice, by applying to the surface of said cereal product a powdered crystalline material comprising any of sucrose, dextrose or mixtures thereof, and coating the surface with a layer of a concentrated aqueous solution of dextrose and sucrose. The coated cereal product is then dried at a temperature below the browning temperature of the product. The resulting coated cereal product has a desirable frosted appearance.

7 Claims, No Drawings

CO-CRYSTALLIZATION OF DEXTROSE AND SUCROSE ON CEREAL PRODUCTS

BACKGROUND OF THE INVENTION

This invention relates to presweetened breakfast cereal products, and more in particular, to cereal products which have been coated with mixtures of sugars to produce a variety of presweetened cold breakfast cereal products for direct sale to the consumer. The sugar coated onto these cereal products have, at least in part, crystallized, thereby giving a consumer-pleasing frosted effect to the product.

Presweetened cold breakfast cereal products have been sold on the consumer market for many years. Generally, the sugar material which was coated on the surface thereof was sucrose. However, during the past several years when the cost of sucrose has risen, interest has been shown in utilizing a substitute for sucrose; such as, corn syrup solids or dextrose which are generally lower in cost than sucrose. Unfortunately, however, the use of these materials produces presweetened cereals which tend to be hygroscopic, and where the sugar is not crystalline. Rather, these coatings tend to be hard, glassy-type, transparent coatings which tend to become tacky upon storage. Recently, procedures have been developed in the art which enable these coatings to be applied in a form which is relatively non-hygroscopic.

However, it has been found that the use of dextrose or dextrose-containing materials as the coating material on cereal products yields products which are insufficiently sweet for the consumer market. It is thus desirable to replace only a portion of the previously utilized sucrose with the dextrose or dextrose-containing material. Prior to this invention, it has not been possible to produce a coating on a breakfast cereal product wherein dextrose and sucrose are co-crystallized onto the surface of the cereal product. Through the utilization of the process of this invention it is, however, possible to form frosted crystalline coatings on these cereal products wherein at least a portion of the dextrose and sucrose are in the crystalline state.

SUMMARY OF THE INVENTION

An aqueous solution of dextrose and sucrose in a pre-determined ratio is formed at a solids concentration of about 80 to 85%, dry substance. This aqueous solution is maintained at a temperature above the saturation temperature of the sugars. A breakfast cereal product is substantially uniformly coated with seed crystals of dextrose, sucrose or a mixture thereof. The previously formed aqueous solution is then coated onto the surface of the cereal product in a substantially uniform manner. The coated cereal product is then dried with controlled heating to reduce the moisture content of the coating. The temperature should always remain below that which can cause browning of the cereal product. The drying is continued until a moisture content of not less than about 3% to about 4% remains in the coating. The coated cereal product is then sealed and stored. The coating gradually whitens due to the formation of crystals on the surface and the crystallization is generally complete after a period of about 2 to 3 days.

It is possible to introduce the seed material and sugar solution onto the surface of the cereal product either simultaneously or in either order, provided a uniform distribution of both materials is obtained.

DETAILED DESCRIPTION OF THE PREFERRED EMBODIMENTS

This invention is useful to produce a wide variety of presweetened breakfast cereal products. Generally, the process may be utilized to produce any frosted breakfast cereal product which has been conventionally been produced with a sucrose coating.

An aqueous solution of dextrose and sucrose is formed having a predetermined ratio of dextrose to sucrose. Generally, any commercial form of dextrose or sucrose may be used; e.g., the commercial granulated sucrose, anhydrous dextrose, dextrose monohydrate, liquid dextrose and high dextrose corn syrup, provided these corn syrups do not contain excessive levels of impurities, which levels could retard or prevent crystallization. The particular form of dextrose is not critical, as when placed in aqueous solution all are identical. It is, of course, necessary that the weight of water of hydration be taken in account.

The solution is formed in any conventional manner. Generally, it is most convenient to utilize as high a solids concentration as possible so that the subsequent drying step may be carried out as quickly as possible. Generally, the optimum value is the highest which may be conveniently handled; i.e., agitated, pumped, sprayed, etc. Based on these considerations, it has been found convenient to utilize solutions having from about 75% to about 88% total solids and preferably about 85%.

In practicing the process of this invention, any desired dextrose to sucrose ratio may be utilized. The selection of the ratio which is desired will depend upon the particular application, and the desired sweetness level of the final product. Thus, while crystallization of the sugar solution may be done at any values of the dextrose to sucrose ratio, the ultimate selection will be based upon the taste, hygroscopicity, and economic considerations dictated by the particular market for the final product. Experimentally, satisfactory products have been prepared utilizing dextrose to sucrose ratios ranging from 85:15 to 25:75.

It is to be expected that the most satisfactory results may be obtained when utilizing ratios in which one sugar predominates. This is due to the fact that each of the sugars can function as an impurity retarding the crystallization of the other. Thus, when utilizing dextrose to sucrose ratios near 50:50, the rate of crystallization may be substantially slower than when utilizing other ratios of dextrose to sucrose; as at a 50:50 ratio each sugar can be considered to be a maximum impurity of the other.

The aqueous sugar solution should be unsaturated with respect to both sugars; that is, not crystallize in the solution. Generally, convenient operating temperatures will vary from about 90° to 100° C, but such is not critical.

The unsweetened breakfast cereal product is first treated by coating its surface with either a sucrose or dextrose powdered crystalline material. While certain sucrose to dextrose ratios may crystallize satisfactorily without seeding, and in particular those wherein sucrose is the predominant sugar, it is preferred that the surface of the cereal product be coated with these seed crystals. In general, the seed material may be sucrose, anhydrous dextrose or dextrose monohydrate interchangeably. However, where dextrose makes up at least about 65% of the total sugar in the solution, seeding with either anhydrous dextrose or dextrose monohydrate is superior to seeding with sucrose. Where less than about 65% of the total sugar is dextrose, the choice of seed crystal is immaterial.

The seeding is performed in any conventional manner which will uniformly coat the surface, such as by dusting or tumbling the dry cereal product with a quantity of finely comminuted seed material. The quantity of seed material utilized is not critical. An excess of seed material may be utilized if the excess can be removed from the system. Generally, the amount of seed material adhering to the surface will be about 1% to 2% based on weight of the cereal product when using corn flakes as the cereal product. The sieve analyses of the seed materials used in the following example are set forth in Table I. These, however, are illustrative only.

TABLE I

| U.S. Standard Sieve | Dextrose Monohydrate | Anhydrous Dextrose | Sucrose |
|---|---|---|---|
| +30 | 5.6 | 0 | 0 |
| −30 + 50 | 11.7 | 2.0 | 0 |
| −50 + 100 | 23.5 | 20.2 | 4.0 |
| −100 + 200 | 34.2 | 40.3 | 36.3 |
| −200 + 325 | 16.9 | 22.8 | 50.2 |
| −325 | 8.1 | 14.7 | 9.5 |

The sugar solution is then applied in a thin, uniform coating onto the surface of the cereal product. It is convenient to spray the surface with the solution, but the mode of application is not crucial so long as the proper coating is obtained.

Another suitable method would be what is called the "random drip method" as described in U.S. Pat. No. 3,959,498.

It has been found that the amount of coating material applied to the surface is preferably in the range of about 25% to about 45%, dry basis, based on weight of the cereal product. A most preferable amount is about 35%. These amounts, may, of course, be varied depending on the desired sweetness of the final product.

The moisture content of the applied sugar solution is then reduced. There are two important considerations here — drying temperature and final moisture content of the coating.

With regard to the temperature at which the moisture content is reduced, it is important that the temperature not be sufficiently high to produce an unacceptable browning of the product which may happen in the presence of a reducing sugar. The particular drying temperature utilized is related to the drying time; i.e., higher temperatures may be used when the times are short. Commercially feasible conditions for drying would be a temperature of about 100° to about 120° C for about 30 minutes or less.

The moisture content of the coated material should be such that the crystallization if facilitated. In general, crystallization will be inhibited if the total moisture content is reduced below 3 to 4%. This is believed to be due to the fact that crystal growth occurs on the faces of the seed material. The rate of crystallization is in part controlled by the rate of diffusion in the coating solution. If overdrying occurs, the mobility of the dextrose and sucrose is reduced, and thus crystallization is impeded and a gloss tends to form. On the other hand, excess moisture is to be avoided, as any free water present can be absorbed by the cereal product causing it to become sodden. The optimum moisture content, therefore, is less than or equal to the amount required to hydrate the dextrose, but, in any event, not less than about 3 to 4%. Preferably, it is the lowest workable amount, such as, for example, 4–7%.

Any method of drying may be used. It is necessary that the drying apparatus be such that it can agitate the material during the drying operation to prevent agglomeration. Examples of such are a vertical turbo-dryer or an agitated belt dryer. On a laboratory scale, the material may be air-dried under ambient conditions.

It is to be understood that the dextrose and sucrose co-crystallize and are not believed to form mixed crystals. In addition, it is not to be expected that all of the sugars present will crystallize, but that a substantial portion will be crystalline, this portion being sufficient to impart the desirable frosted appearance.

The process and products of this invention are more specifically illustrated in the following non-limiting example.

EXAMPLE

1. Preparation of Sugar Solution

The ingredients described below are heated under agitation to 90° to 100° C so as to completely dissolve the sugars:

| | Batch Number | | | | | |
|---|---|---|---|---|---|---|
| | 1 | 2 | 3 | 4 | 5 | 6 |
| Anhydrous dextrose, % | 60.0$^{a)}$ | 20.0 | 74.5 | 56.2 | 65.5 | 23.5 |
| Sucrose, % | 20.0$^{a)}$ | 57.4 | 10.5 | 28.1 | 18.8 | 61.2 |
| Distilled Water, % | 20.0$^{a)}$ | 22.6 | 15.0 | 15.7 | 15.7 | 15.3 |
| Dextrose:Sucrose | 75:25$^{a)}$ | 25.8: 74.2 | 87.6: 12.4 | 66.7: 33.3 | 77.7: 22.3 | 27.7: 72.3 |

$^{a)}$Calculated

Although anhydrous dextrose was used in all the above tests, there is little doubt that hydrate dextrose and liquid dextrose would also be satisfactory for solution make-up.

The solids concentration should be as high as can be transported, to minimize the drying required later; crystallization considerations limit the solids content to a maximum of about 96%. A value of 85% was selected for these tests as being the maximum which could be handled with the available equipment.

2. Preparation of Corn Flakes

Special treatment of the corn flakes was required to determine the effect of seeding on crystallization of the sugar solutions described above. For these experiments, seeding was simulated by dusting the corn flakes with powdered, crystalline sugar (sucrose, anhydrous or hydrate dextrose). This dusting was accomplished by agitating a mixture of plain corn flakes and powdered sugar until the cereal surface was uniformly dusted, then sieving off excess sugar. The estimated seed concentration was 1.5% of the plain cereal weight. For each experiment plain corn flakes were used as an unseeded control.

The type of seed used in each of the tests is summarized as follows (U= unseeded; S= sucrose; D= dextrose; DH= hydrate dextrose):

| Batch No. | Seed Type |
|---|---|
| 1 | U, S |
| 2 | U, S |
| 3 | U, S |
| 4 | U, S |
| 5 | U, S, D, DH |

-continued

| Batch No. | Seed Type |
|---|---|
| 6 | U, S, D |

3. Spray Application of Sugar Solution Onto Corn Flakes

For all tests, the sugar solutions were sprayed onto corn flakes by means of pneumatic atomizing nozzle (Spraying Systems Company: fluid nozzle #2850, air nozzle #64), where nitrogen was used as the atomizing gas. Sugar solution was delivered to the nozzle by pressurizing the solution-containing vessel to about 20 psig, thus forcing the solution out of the vessel through a dip tube immersed in the solution. The atomizing nitrogen pressure varied from 25–40 psig. The estimated applied sugar dosage was about 35% based on plain cereal weight. Any method by which a thin coating of sugar solution could be applied to the cereal surface would be satisfactory. In the above described configuration, vessel and atomization pressures were selected based on the characteristics of the available nozzle and convenience. Also, there is nothing significant in the use of nitrogen as the atomizaing gas; air would be as good.

To achieve a uniform distribution of sugar solution on the total cereal surface area, a commercial process would require some means of agitating the cereal during application. For these experiments, however, we were not concerned about obtaining a total coating, and no cereal agitation was used.

4. Drying the Coated Cereal flakes

Following the application of the sugar solution, the corn flakes were dried, then treated in a variety of ways to observe the effect of crystallization. Up to this point the procedures, as described previously, varied little from test to test. Because the drying operation appears to be critical to the degree of crystallization attained, this portion of the tests will be described on a test-to-test basis.

Batch 1: Dextrose:Sucrose 75:25 Unseeded, sucrose seeded

The unseeded and sucrose-seeded samples were split for drying at ambient conditions and at 71° C for 45 minutes. All samples were left exposed to the atmosphere, where after a period of 2–3 days, light crystallization was observed on those samples which had been seeded. Subsequent dessication of all samples produced no visible change.

Batch 2: Dextrose:Sucrose 25:75 Unseeded, sucrose seeded

The unseeded and sucrose-seeded samples were split for drying at ambient conditions and at 60° and 150° C for 45 minutes. After the oven drying, all samples were left exposed to the atmosphere, where after 2 to 3 days, light crystallization was observed on all samples, seeded and unseeded, except those dried at 150° C. In addition to showing no crystallization, the flakes dried at 150° C turned dark brown.

Batch 3: Dextrose:Sucrose 85:15 Unseeded, sucrose seeded

The unseeded and sucrose-seeded samples were split for drying at ambient conditions and at 60° and 150° C for 1 hour. All samples were left exposed to the atmosphere overnight. The next day, portions of each sample were: (1) dessicated; (2) bottled; or (3) placed in an oven at 60° C for one hour. From the oven, separate samples were: (1) dessicated, (2) bottled, or (3) exposed to the atmosphere.

All corn flake samples which were initially dried at 150° C turned dark brown, with no crystallization observed. All samples shich ended their treatment with dessication (except those dried at 150° C) showed light crystallization. All samples (except those dried at 150° C) which ended their treatment by exposure to the atmosphere showed moderate to heavy crystallization. Those samples which were bottled immediately following the second 60° C treatment showed no crystallization and were very sticky.

When the immediately bottled samples failed to crystallize after about two weeks, they were opened and portions were removed and exposed to the atmosphere; the remaining portion of the samples were resealed. Those flakes exposed to the atmosphere began to crystallize after about 4 to 6 days; those remaining in the bottle did not cyrstallize.

Batch 4: Dextrose:Sucrose 65:35 Unseeded, sucrose seeded

The unseeded and sucrose-seeded samples were split for drying at ambient conditions and at 60° C for one and two hours. After the drying period, all samples, except the seeded air-dried sample, were placed in dessication. The excepted sample was left exposed to the air. After 3 days, all samples were bottled. On inspection 18 days later, the only sample which had crystallized was the sample which had not been dessicated. At this point, portions from all samples were exposed to the atmosphere, with the remaining portion being immediately resealed. After an additional eight days, all samples left sealed showed no change. Those opened to the air all showed light to moderate crystallization, including those which had not been seeded.

Batch 5: Dextrose:Sucrose 75:25 Unseeded, sucrose, anhydrous and hydrate dextrose seeded The corn flakes seeded with hydrate dextrose were dried at 45°, the remaining at 60° C, for times from 20 to 240 minutes. After drying each sample was immediately sealed. The solids content of the coating solution was measured at each time of sampling. After 5 days, results indicated crystallization only on those samples seeded with anhydrous or hydrate dextrose. In addition, little or no crystallization was observed on those samples which were dried for longer than two hours, which corresponds to a coating solution content of 94 to 95%.

Batch 6: Dextrose:Sucrose 25:75 Unseeded, sucrose and anhydrous dextrose seeded The three sets of coated corn flake samples, differing in seed type, were dried at 60° C for times varying from 20 minutes to 18 hours. After drying each sample was immediately sealed. After 4 days, results indicated no crystallization on the unseeded samples; the sucrose and dextrose-seeded samples showed roughly equivalent degrees of crystallization.

While the invention has been described in connection with specific embodiments thereof, it will be understood that it is capable of further modification, and this application is intended to cover any variations, use or adaptions of the invention following, in general, the principles of the invention and including such departures from the present disclosure as come within the known or customary practice in the art to which the invention pertains and as may be applied to the essential features hereinbefore set forth, and as fall within the scope of the invention.

What is claimed is:

1. A process for the co-crystallization of dextrose and sucrose onto the surface of a breakfast cereal product comprising the steps of:
   (a) preparing an aqueous solution of dextrose and sucrose having a predermined ratio of dextrose to sucrose and having total sugar content of at least about 75%, by weight;
   (b) coating the surface of said cereal product with a powdered seed material selected from the group consisting of anhydrous dextrose, dextrose monohydrate and sucrose;
   (c) applying a thin film of said aqueous solution onto the surface of the dusted cereal product;
   (d) reducing the moisture content of said thin film to not less than about 3%; and,
   (e) allowing the sugars in said thin film to crystallize.

2. A process in accordance with claim 1, wherein said breakfast cereal product is corn flakes.

3. A process in accordance with claim 1, wherein the amount of seed material utilized is in the range of about 1% to about 2%, based on weight of cereal product.

4. A process in accordance with claim 1, wherein the quantity of aqueous solution utilized is in the range of about 25% to about 45%, dry basis, based on weight of cereal product.

5. A process in accordance with claim 1, wherein said predetermined ratio of dextrose to sucrose is at least about 65:35 and said seed material is anhydrous dextrose or dextrose monohydrate.

6. A process in accordance with claim 1, wherein the aqueous solution is sprayed onto the surface of the dusted cereal product.

7. A process in accordance with claim 1, wherein the moisture content is reduced by heating the coated breakfast cereal product at a temperature in the range of from about 100° to about 120° C for up to about 30 minutes.

* * * * *